United States Patent
Fukutake

[19]

[11] Patent Number: 5,889,618
[45] Date of Patent: Mar. 30, 1999

[54] OBJECT LENS FOR MICROSCOPE

[75] Inventor: Naoki Fukutake, Kawasaki, Japan

[73] Assignee: Nikon Corporation, Tokyo, Japan

[21] Appl. No.: 961,569

[22] Filed: Oct. 30, 1997

[30]  Foreign Application Priority Data

Oct. 30, 1996 [JP] Japan .................................. 8-304035

[51] Int. Cl.$^6$ .................................................. G02B 21/02
[52] U.S. Cl. .......................... 359/661; 359/659; 359/660; 359/791
[58] Field of Search .................................. 359/659, 660, 359/661, 791

[56]  References Cited

U.S. PATENT DOCUMENTS

| | | | |
|---|---|---|---|
| 2,644,362 | 7/1953 | Ravizza et al. | 359/660 |
| 3,355,234 | 11/1967 | Muller | 359/660 |
| 3,592,530 | 7/1971 | Klein | 359/660 |
| 4,174,151 | 11/1979 | Yonekubo | 359/660 |
| 4,208,099 | 6/1980 | Tojyo | 359/659 |
| 4,212,515 | 7/1980 | Itaya | 359/659 |
| 4,279,477 | 7/1981 | Tojo | 359/660 |
| 4,417,787 | 11/1983 | Danner | 359/659 |
| 5,216,545 | 6/1993 | Saito | 359/661 |
| 5,444,573 | 8/1995 | Saito | 359/661 |
| 5,808,807 | 9/1998 | Ryzhikov | 359/660 |

*Primary Examiner*—Georgia Epps
*Assistant Examiner*—Evelyn A. Lester
*Attorney, Agent, or Firm*—Chapman and Cutler

[57]  ABSTRACT

An inexpensive achromatic object lens for a microscope has a magnification of about 20 and a relatively long working distance. Aberrations are satisfactorily corrected even at the periphery of the image. The object lens includes a first lens group having a positive refractive power, a second lens group having a positive refractive power, and a third lens group having a negative refractive power in this order from the object side. The first lens group consists of a positive lens and a cemented lens which is composed of a negative lens and a positive lens. The second lens group consists of a positive lens for converting the divergent light flux that has exited the first lens group into convergent light flux. The third lens group consists of a negative meniscus lens with its concave surface facing the image side. The object lens satisfies the conditions $4.0 \leq f1/d0 \leq 15.0$, $55 \leq v2p$, and $35 \leq v1p-v1n$.

20 Claims, 9 Drawing Sheets

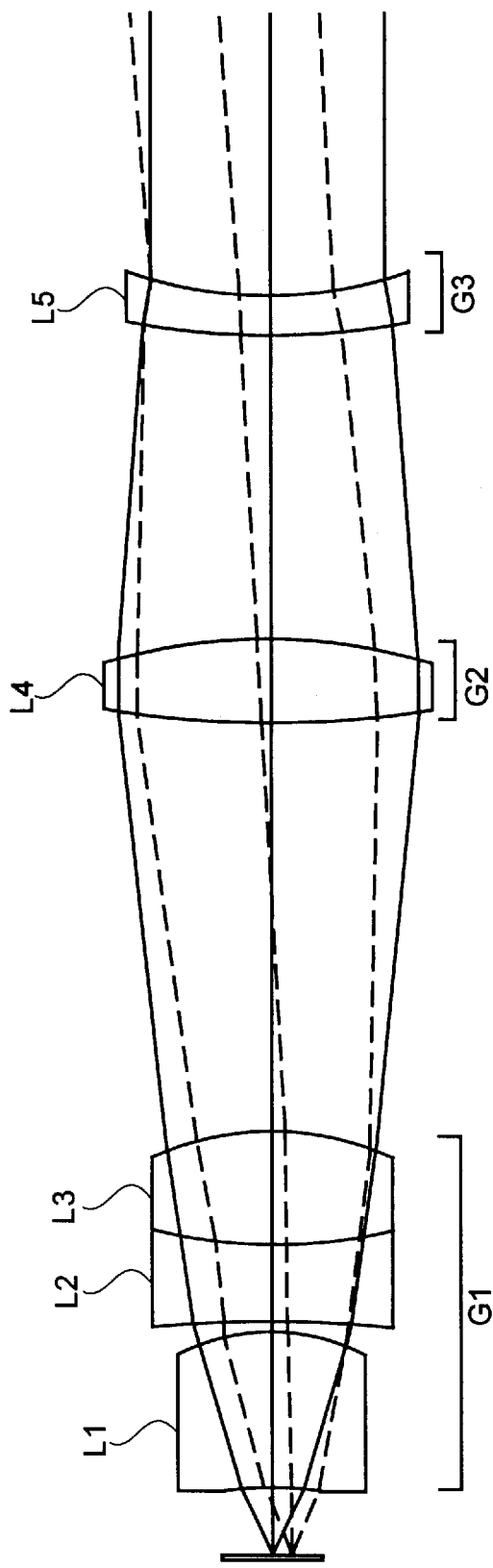

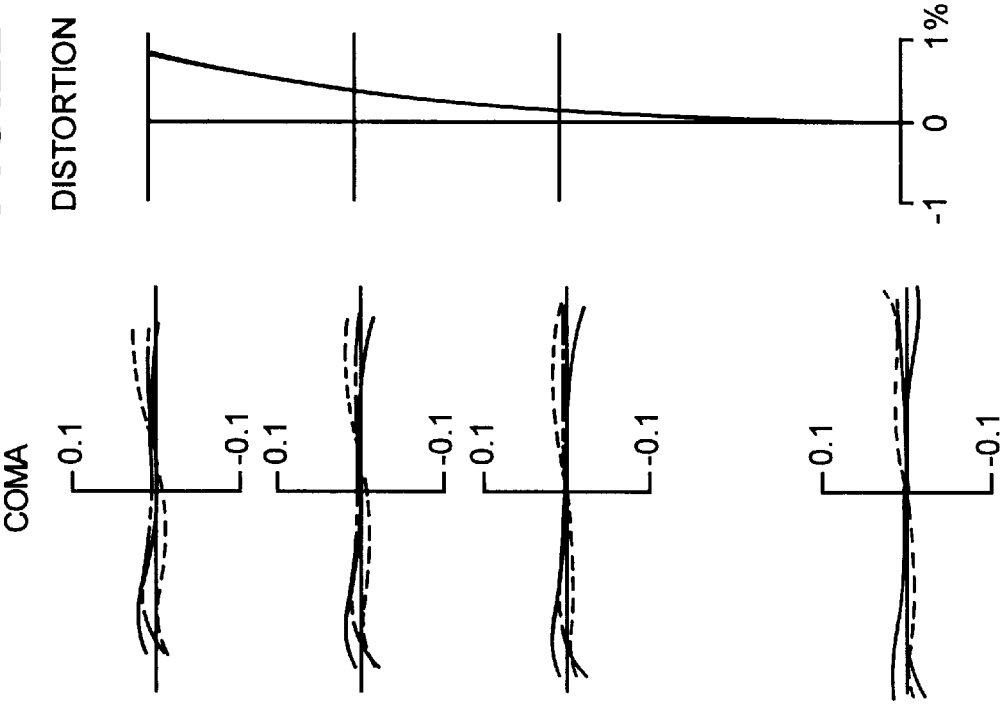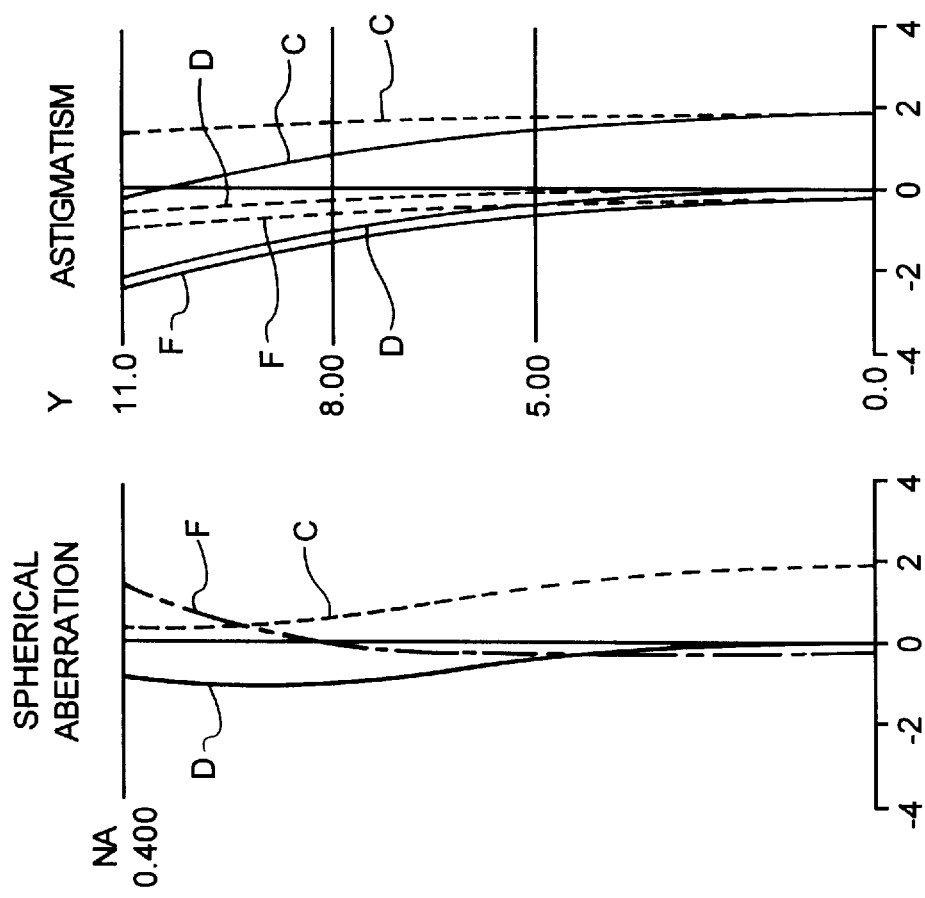

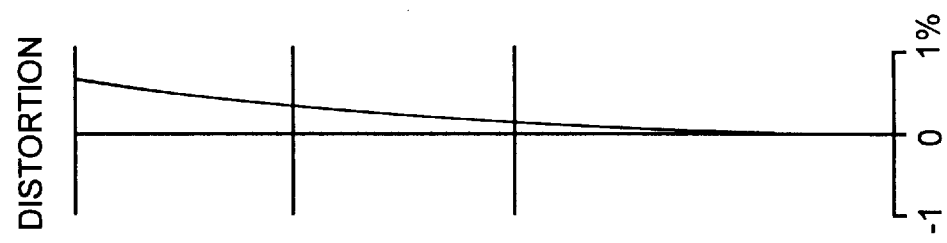
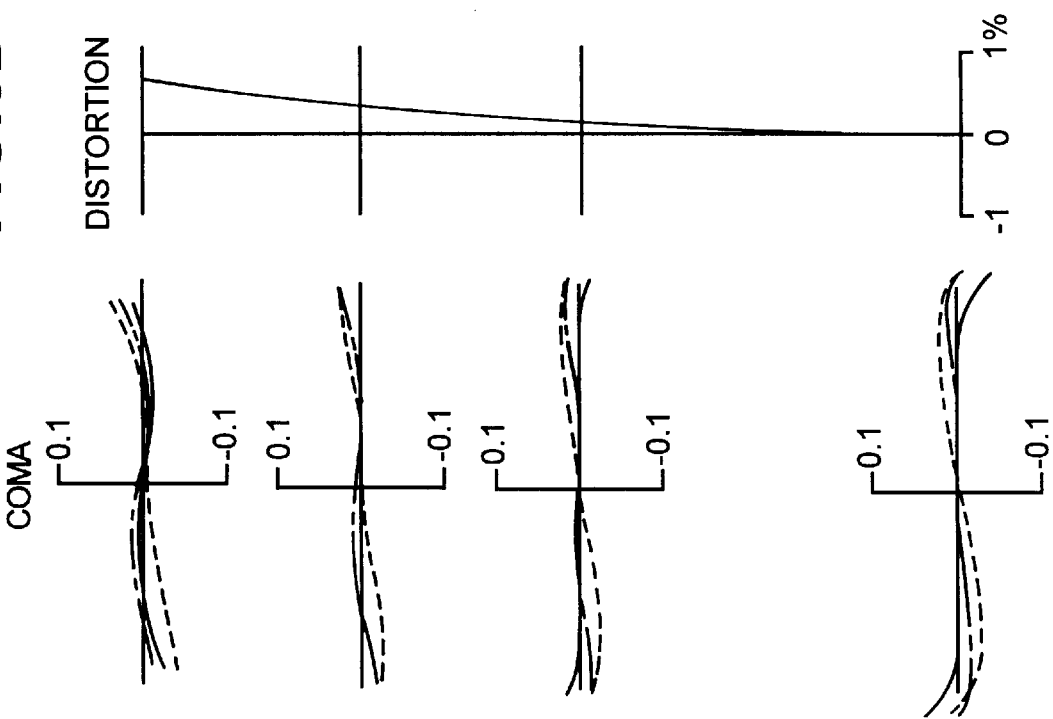
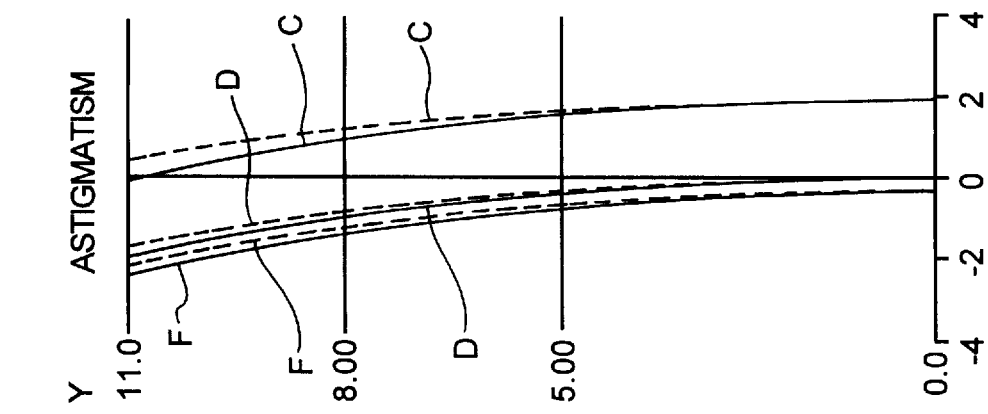
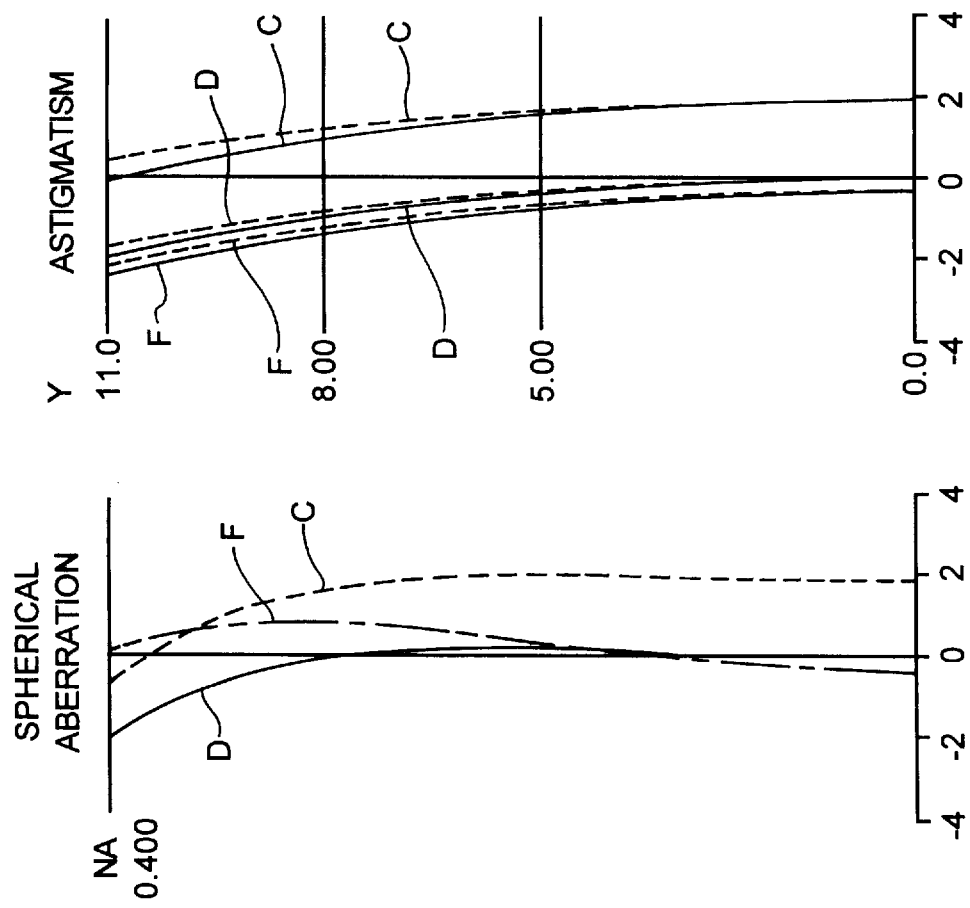

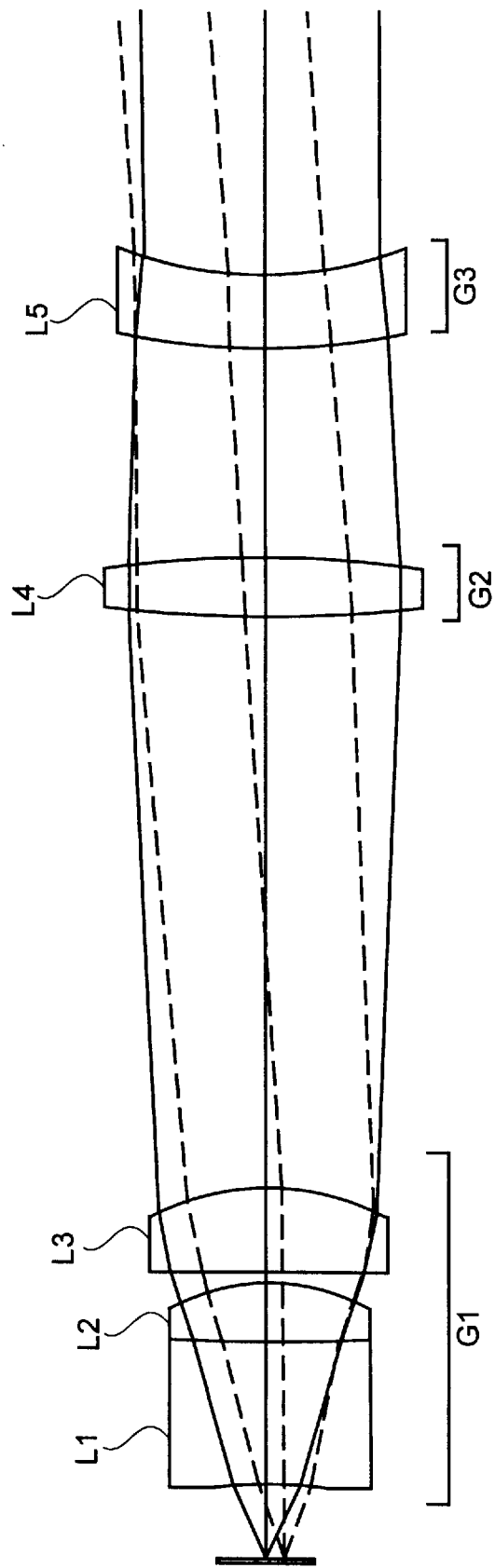

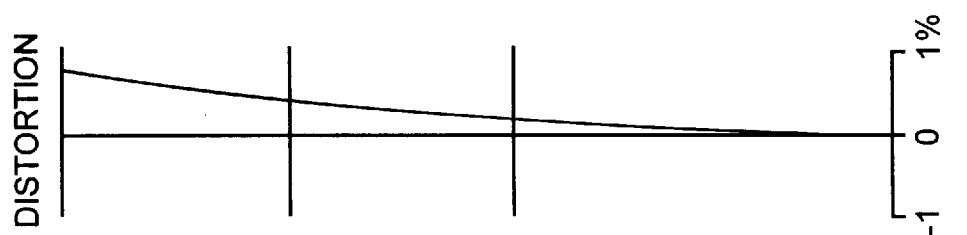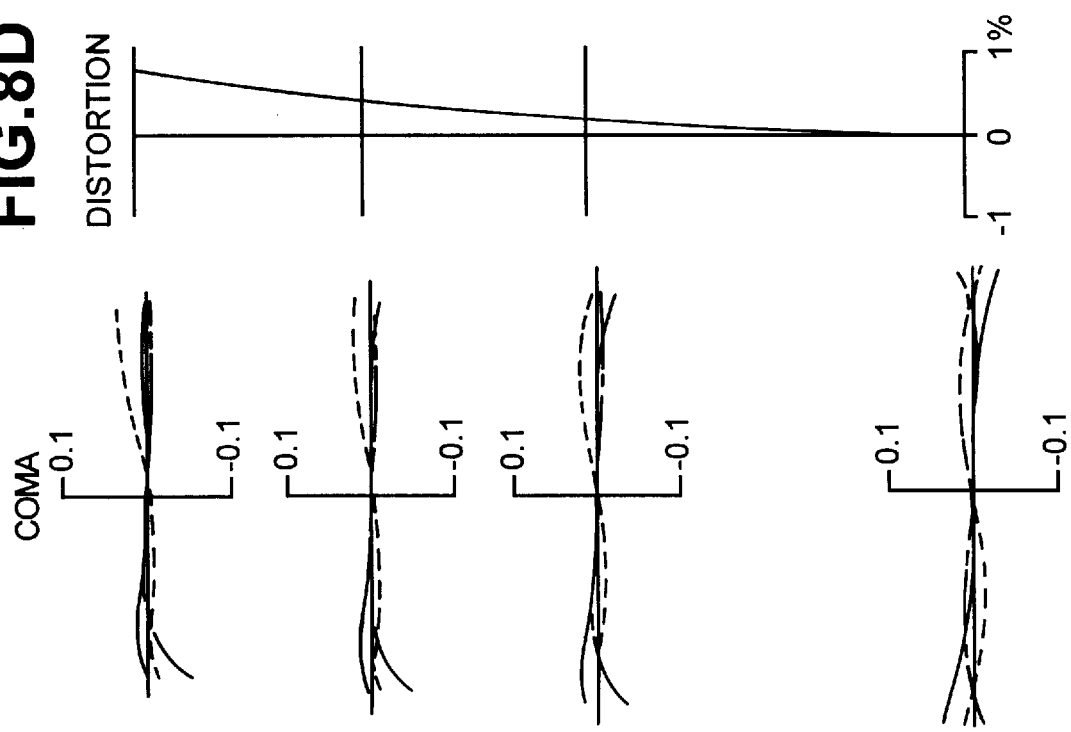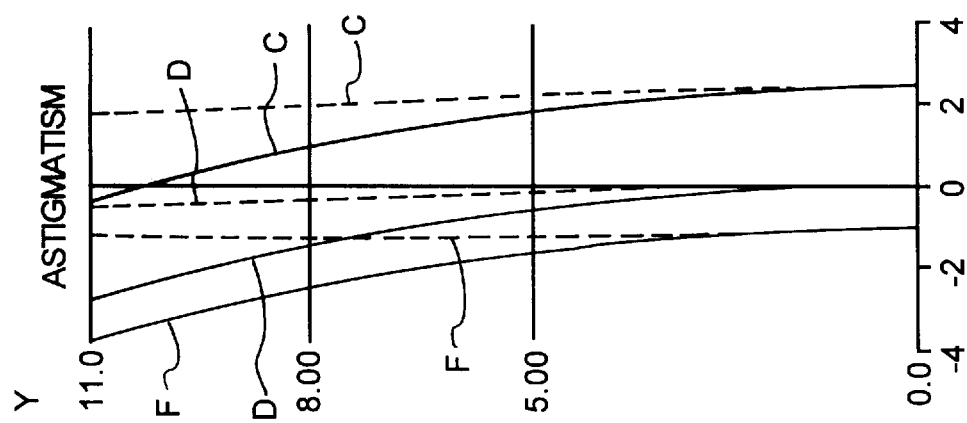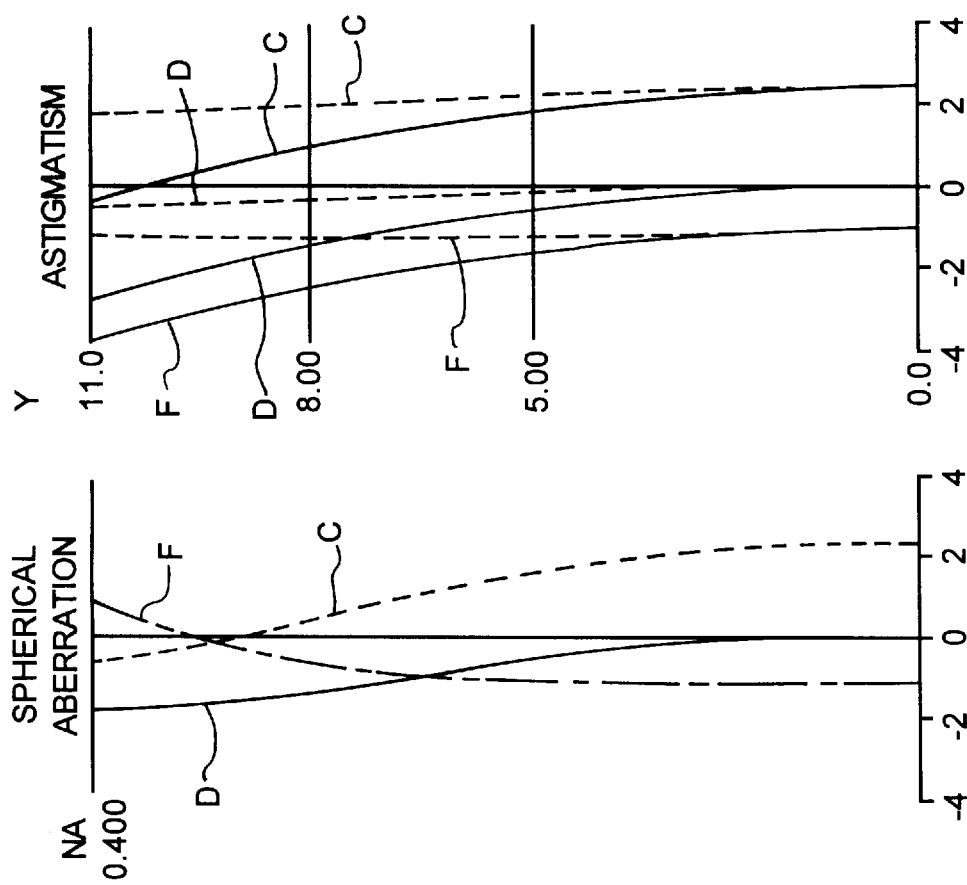

OBJECT LENS FOR MICROSCOPE

BACKGROUND OF THE INVENTION

1. Field of the Invention

This invention relates to an object lens for a microscope and, more particularly, to an achromatic object lens used in a microscope having a magnification of about 20.

2. Description of Related Art

It is desired for an achromatic object lens used in a general-purpose optical microscope to be inexpensive. Because of this desire, inadequate correction for image deformation or aberrations of the lens may occur in a conventional object lens for a general-purpose microscope. The image quality of such a conventional object lens is often not satisfactory.

SUMMARY OF THE INVENTION

This invention was conceived in view of the situation mentioned above. One object of the invention is to provide an inexpensive achromatic object lens for a microscope which has a magnification of about 20 with a relatively long working distance and in which various aberrations are satisfactorily corrected even at the periphery of the image.

In order to achieve this object, the object lens according to the invention comprises a first lens group G1 having a positive refractive power, a second lens group G2 having a positive refractive power, and a third lens group G3 having a negative refractive power in this order from the object side. The first lens group consists of a positive lens and a cemented lens which is composed of a negative lens L1n and a positive lens L1p. The second lens group consists of a positive lens L2p for converting the divergent light flux that has exited the first lens group G1 into convergent light flux. The third lens group consists of a negative meniscus lens with its concave surface facing the image side. The object lens satisfies the conditions $$4.0 \leq f1/d0 \leq 15.0$$

$$55 \leq v2p$$

$$35 \leq v1p - v1n$$

where f1 is the focal length of the first lens group G1, d0 is the distance along the optical axis of the object lens between the image-side surface of a cover glass and the surface that is positioned closest to the object in the first lens group G1, v2p is the Abbe number of the positive lens L2p of the second lens group G2, v1p is the Abbe number of the positive lens L1p that composes the cemented lens in the first lens group G1, and v1n is the Abbe number of the positive lens L1n that composes the cemented lens in the first lens group G1.

The object lens for a microscope according to the invention has a magnification of about 20 and a numerical aperture (NA) of about 0.4. The working distance of the object lens, which is a distance from the end of the object lens to the image-side surface of the cover glass, is relatively long. In the arrangement described above, the various aberrations of the lens are satisfactorily corrected even at the periphery of the image.

BRIEF DESCRIPTION OF THE DRAWINGS

The above and other objects, features, and advantages of the present invention will be apparent from the detailed description which follows and from reference to the attached drawings, wherein:

FIG. 1 illustrates the lens arrangement of the object lens for a microscope according to a first embodiment of the invention;

FIG. 2 illustrates various aberrations of the object lens according to the first embodiment;

FIG. 6 illustrates various aberrations of the object lens according to the third embodiment;

FIG. 7 illustrates the lens arrangement of the object lens for a microscope according to a fourth embodiment of the invention;

FIG. 8 illustrates various aberrations of the object lens according to the fourth embodiment.

DESCRIPTION OF THE PREFERRED EMBODIMENTS

Figure 3:
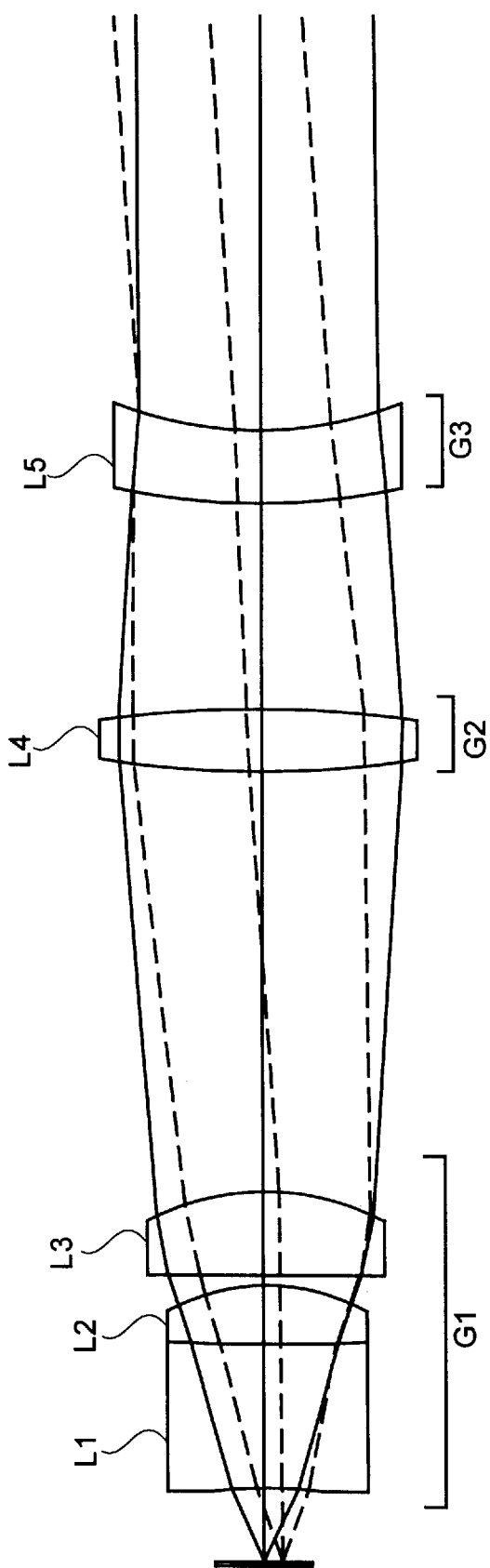
FIG. 3 illustrates the lens arrangement of the object lens for a microscope according to a second embodiment of the invention.

As a basic structure, the object lens according to the invention has three lens groups. These lens groups are a first lens group G1 having a positive refractive power, a second lens group G2 having a positive refractive power, and a third lens group G3 having a negative refractive power in this order from the object side. The first lens group consists of a positive lens and a cemented lens which is composed of a negative lens L1n and a positive lens L1p. The second lens group consists of a positive lens L2p for converting the divergent light flux that has exited the first lens group G1 into convergent light flux. The third lens group consists of a negative meniscus lens having a concave surface on the image side.

Because the first lens group G1, which is positioned closest to the object, consists of a positive lens and a cemented lens having a positive refractive power as a whole, the positive refraction is dispersed by the two lenses. This allows aberrations of the object lens to be satisfactorily corrected. The cemented lens, in particular, contributes to the correction of chromatic aberration. The second lens group G2 having a positive refractive power and the third lens group G3 having a negative refractive power are positioned behind the first lens group G1. This arrangement can reduce the Petzval sum to almost zero (0), thereby making the image plane substantially flat.

In addition to this arrangement, the object lens of the invention satisfies the following conditions $$4.0 \leq f1/d0 \leq 15.0 \qquad (1)$$

$$55 \leq v2p \qquad (2)$$

$$35 \leq v1p - v1n \qquad (3)$$

where f1 is the focal length of the first lens group G1, d0 is the working distance along the optical axis of the object lens between the image-side surface of a cover glass and the surface that is positioned closest to the object in the first lens group G1, v2p is the Abbe number of the positive lens L2p of the second lens group G2, v1p is the Abbe number of the positive lens L1p that composes the cemented lens in the first lens group G1, and ν1n is the Abbe number of the positive lens L1n that composes the cemented lens in the first lens group G1.

Condition (1) defines a preferable range of the diverging angle of the light flux emitted from the first lens group G1. If the diverging angle exceeds the upper limit of condition (1), then an excessive refractive power must be given to the second lens group G2 in order to converge the divergent light flux coming from the first lens group G1, which makes it difficult to correct the coma. If the diverging angle is below the lower limit of condition (1), then the refraction of the first lens group becomes too large, and the spherical aberration gets worse. Further, the Petzval sum increases, and it becomes difficult to correct the field curvature.

Conditions (2) and (3) are related to chromatic aberration. If conditions (2) and (3) are not satisfied, then chromatic aberration of the object lens can not be satisfactorily corrected.

The details of the embodiments of the invention will now be described with reference to the attached drawings.

In the various embodiments which will be described below, a focusing lens (or a second objective) is positioned between the object lens and the resultant image so that there is a predetermined air gap (e.g., 90 mm to 200 mm) between the object lens and the focusing lens. The object lens and the focusing lens form a finite optical system in a microscope.

Figure 9:
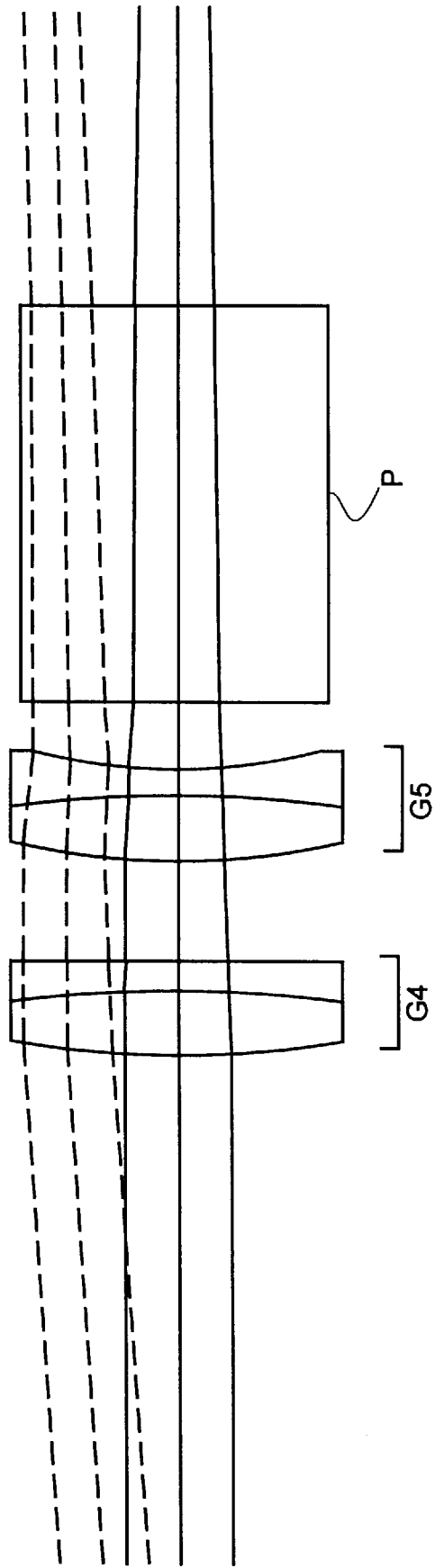
FIG. 9 illustrate the lens arrangement of a focusing lens used together with the object lens of the respective embodiments.

An example of the focusing lens is shown in FIG. 9. The focusing lens shown in FIG. 9 has a cemented positive lens G4 composed of a biconvex lens and a biconcave lens, a cemented negative lens G5 composed of a biconvex lens and a biconcave lens, and a prism P.

Table 1 lists the lens data of the focusing lens used in each embodiment. The left column of Table 1 indicates the lens surfaces as numbered in a serial order from the object side. Moreover, "r" denotes the radius of curvature of each lens surface, "d" denotes the distance between two adjacent lens surfaces, "n" denotes the refractive index with respect to the d-line ($\lambda$=587.6 nm), and "ν" denotes the Abbe number. In all tables, lengths, distances and so on are in mm unless otherwise indicated.

TABLE 1

| | r | d | nd | νd | |
|---|---|---|---|---|---|
| 1 | 75.0430 | 5.10 | 1.62 | 57.0 | |
| 2 | −75.0430 | 2.00 | 1.75 | 35.2 | |
| 3 | 1600.5800 | 7.50 | | | |
| 4 | 50.2560 | 5.10 | 1.67 | 42.0 | |
| 5 | −84.5410 | 1.80 | 1.61 | 44.4 | |
| 6 | 36.9110 | 5.50 | | | |
| 7 | ∞ | 30.00 | 1.57 | 56.0 | (prism P) |
| 8 | ∞ | | | | |

<First Embodiments>

FIG. 1 illustrates the lens arrangement of the microscope object lens according to the first embodiment of the invention.

The object lens consists of three lens groups G1, G2 and G3 in this order from the object side. The first lens group G1 includes a positive meniscus lens L1 with its concave surface facing the object side, and a cemented positive lens which is composed of a biconcave lens L2 and a biconvex lens L3. The second lens group G2 consists of a biconvex lens L4. The third lens group G3 consists of a negative meniscus lens L5 with its concave surface facing the image side.

Table 2 lists the lens data of the object lens according to the first embodiment. In Table 2, f denotes the focal length of the object lens itself, NA denotes the numerical aperture of the object lens, $\beta$ denotes the magnification achieved by the object lens and the focusing lens defined by Table 1, and WD denotes the working distance (which equals the distance d0 along the optical axis between the image-side surface of the cover glass and the surface that is positioned closest to the object in the first lens group G1). Also, f1 is the focal length of the first lens group G1, f2 is the focal length of the second lens group G2, and f3 is the focal length of the third lens group G3. The left column of Table 2 indicates the lens surfaces as numbered in serial order from the object side. Additionally, "r" denotes the radius of curvature of each lens surface, "d" denotes the distance between two adjacent lens surfaces, "n" denotes the refractive index with respect to the d-line ($\lambda$=587.6 nm), and "ν" denotes the Abbe number with respect to the d-line.

TABLE 2 f = 10.06
NA = 0.40
$\beta$ = 20X
WD = 2.598

| | r | d | nd | νd |
|---|---|---|---|---|
| 1 | 9.0018 | 5.45 | 1.75 | 52.3 |
| 2 | −6.5101 | 0.30 | | |
| 3 | −71.9220 | 2.85 | 1.86 | 23.0 |
| 4 | 17.9332 | 4.00 | 1.50 | 82.5 |
| 5 | −9.7082 | 14.50 | | |
| 6 | 30.7580 | 2.80 | 1.52 | 70.0 |
| 7 | −30.7580 | 10.80 | | |
| 8 | 23.4773 | 1.50 | 1.52 | 58.9 |
| 9 | 12.0001 | | | |

(Corresponding parameters of the object lens)
f1 = 12.52
f2 = 30.12
f3 = −49.58
(1) f1/d0 = 4.819
(2) ν2p = 70.0
(3) ν1p−ν1n = 59.5

FIG. 2 illustrates various aberrations in the first embodiment. In FIG. 2, NA denotes the numerical aperture, Y denotes the image height, D denotes the d-line ($\lambda$=587.6 nm), C denotes the C-line ($\lambda$=656.3 nm), and F denotes the F-line ($\lambda$=486.1 nm). In the diagram that shows astigmatism, the solid lines indicate the sagittal image plane, and the broken lines indicate the meridional image plane. As is clear from FIG. 2, the aberrations of the object lens are satisfactorily corrected.

<Second Embodiment>

FIG. 3 illustrates the lens arrangement of the microscope object lens according to the second embodiment of the invention.

This object lens consists of three lens groups G1, G2 and G3 in this order from the object side. The first lens group G1 has a cemented positive lens, composed of a biconcave lens L1 and a biconvex lens L2, and a biconvex lens L3 in this order from the object side. The second lens group G2 consists of a biconvex lens L4. The third lens group G3 consists of a negative meniscus lens L5 with its concave surface facing the image side.

Table 3 lists the lens data of the object lens according to the second embodiment. In Table 3, f denotes the focal length of the object lens itself, NA denotes the numerical aperture of the object lens, $\beta$ denotes the magnification achieved by the object lens and the focusing lens, and WD denotes the working distance (which equals the distance d0 along the optical axis between the image-side surface of the cover glass and the surface that is positioned closest to the object in the first lens group G1). Again, f1 is the focal length of the first lens group G1, f2 is the focal length of the second lens group G2, and f3 is the focal length of the third lens group G3.

The left column indicates the lens surfaces as numbered in serial order from the object side. Again, "r" denotes the radius of curvature of each lens surface, "d" denotes the distance between two adjacent lens surfaces, "n" denotes the refractive index with respect to the d-line (λ=587.6 nm), and "v" denotes the Abbe number with respect to the d-line.

TABLE 3 f = 10.19
NA = 0.40
β = 20X
WD = 2.60

|   | r | d | nd | vd |
|---|---|---|----|----|
| 1 | −11.3644 | 4.90 | 1.85 | 23.8 |
| 2 | 31.0140 | 2.20 | 1.50 | 82.5 |
| 3 | −7.1059 | 0.30 | | |
| 4 | 500.2700 | 3.05 | 1.52 | 70.0 |
| 5 | 8.9011 | 15.00 | | |
| 6 | 40.9040 | 2.20 | 1.52 | 70.0 |
| 7 | −40.9040 | 7.25 | | |
| 8 | 18.1403 | 2.60 | 1.55 | 45.9 |
| 9 | 11.9598 | | | |

(Corresponding parameters of the object lens)
f1 = 12.07
f2 = 39.80
f3 = −75.25
(1) f1/d0 = 4.642
(2) v2p = 70.0
(3) v1p−v1n = 58.7

Figure 4:
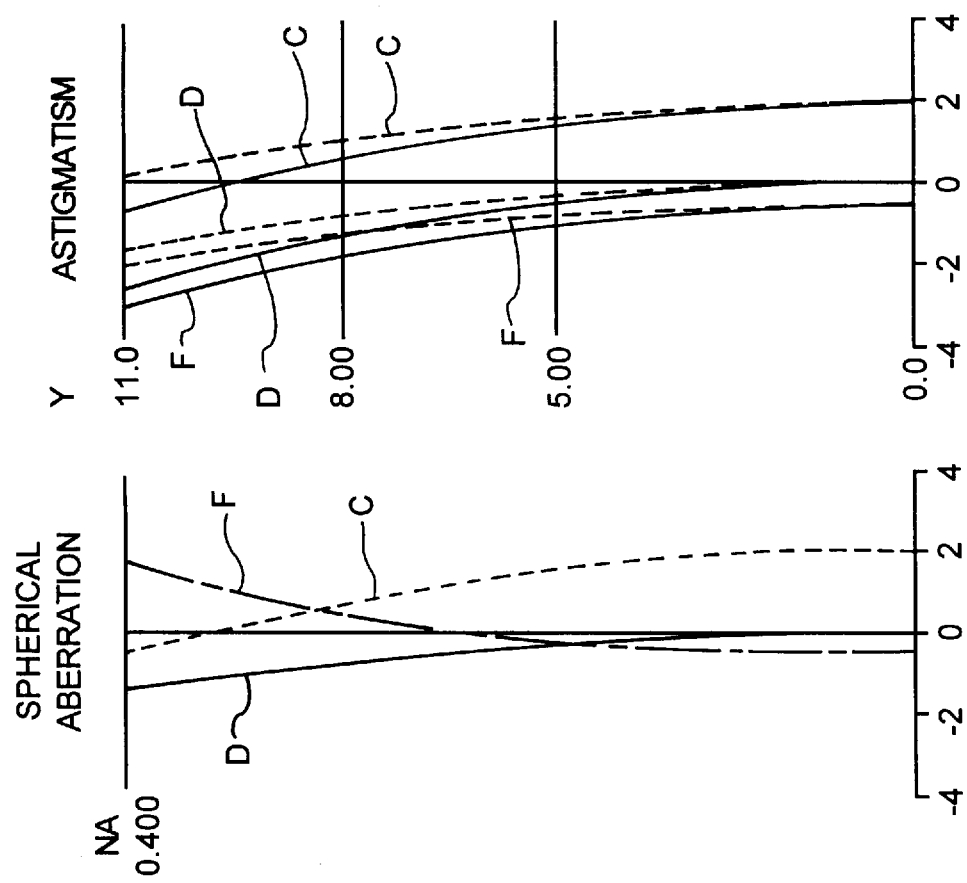
FIG. 4 illustrates various aberrations of the object lens according to the second embodiment.

FIG. 4 illustrates various aberrations in the second embodiment. In FIG. 4, NA denotes the numerical aperture, Y denotes the image height, D denotes the d-line (λ=587.6 nm), C denotes the C-line (λ=656.3 nm), and F denotes the F-line (λ=486.1 nm). In the diagram that shows astigmatism, the solid lines indicate the sagittal image plane, and the broken lines indicate the meridional image plane. As is clear from FIG. 4, the aberrations of the object lens are satisfactorily corrected.

<Third Embodiment>

Figure 5:
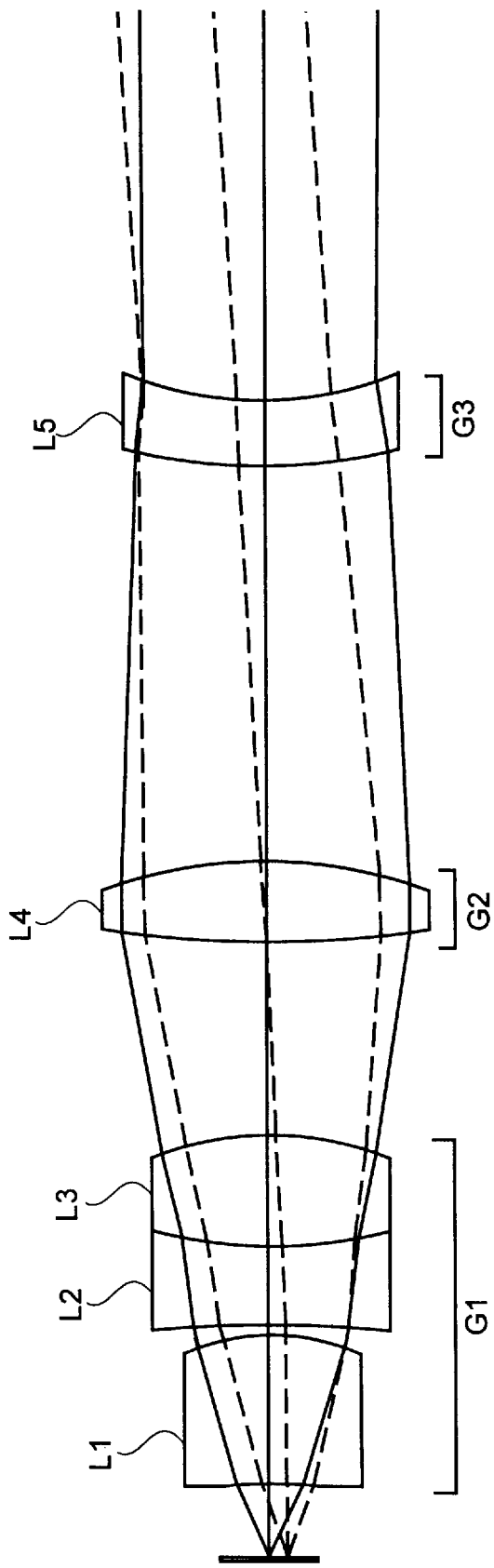
FIG. 5 illustrates the lens arrangement of the object lens for a microscope according to a third embodiment of the invention.

FIG. 5 illustrates the lens arrangement of the microscope object lens according to the third embodiment of the invention.

This object lens consists of three lens groups G1, G2 and G3 in this order from the object side. The first lens group C1 has a positive meniscus lens L1 with its concave surface facing the object side, and a cemented positive lens composed of a biconcave lens L2 and a biconvex lens L3 in this order from the object side. The second lens group G2 consists of a biconvex lens L4. The third lens group G3 consists of a negative meniscus lens L5 with its concave surface facing the image side.

Table 4 lists the lens data of the object lens according to the third embodiment. In Table 4, f denotes the focal length of the object lens itself, NA denotes the numerical aperture of the object lens, β denotes the magnification achieved by the object lens and the focusing lens, and WD denotes the working distance (which equals the distance d0 along the optical axis between the image-side surface of the cover glass and the surface that is positioned closest to the object in the first lens group G1). Once again, f1 is the focal length of the first lens group G1, f2 is the focal length of the second lens group G2, and f3 is the focal length of the third lens group G3.

The left column indicates the lens surfaces as numbered in serial order from the object side. Once again, "r" denotes the radius of curvature of each lens surface, "d" denotes the distance between two adjacent lens surfaces, "n" denotes the refractive index with respect to the d-line (λ=587.6 nm), and "v" denotes the Abbe number with respect to the d-line.

TABLE 4 f = 9.98
NA = 0.40
β = 20X
WD = 2.570

|   | r | d | nd | vd |
|---|---|---|----|----|
| 1 | −7.0000 | 5.45 | 1.77 | 50.2 |
| 2 | −6.3800 | 0.10 | | |
| 3 | −71.9220 | 3.00 | 1.86 | 23.0 |
| 4 | 17.8000 | 3.85 | 1.50 | 82.5 |
| 5 | −13.0000 | 7.00 | | |
| 6 | 40.0000 | 2.80 | 1.50 | 82.5 |
| 7 | −18.4500 | 14.00 | | |
| 8 | 15.3000 | 2.30 | 1.50 | 82.5 |
| 9 | 10.5357 | | | |

(Corresponding parameters of the object lens)
f1 = 17.37
f2 = 25.77
f3 = −80.95
(1) f1/d0 = 6.759
(2) v2p = 82.5
(3) v1p−v1n = 59.5

FIG. 6 illustrates various aberrations in the third embodiment. In FIG. 6, NA denotes the numerical aperture, Y denotes the image height, D denotes the d-line (λ=587.6 nm), C denotes the C-line (λ=656.3 nm), and F denotes the F-line (λ=486.1 nm). In the diagram that shows astigmatism, the solid lines indicate the sagittal image plane, and the broken lines indicate the meridional image plane. As is clear from FIG. 6, the aberrations of the object lens are satisfactorily corrected.

<Fourth Embodiment>

FIG. 7 illustrates the lens arrangement of the microscope object lens according to the fourth embodiment of the invention.

This object lens consists of three lens groups G1, G2 and G3 in this order from the object side. The first lens group G1 has a cemented positive lens composed of a biconcave lens L1 and a biconvex lens L2, and a biconvex lens L3 in this order from the object side. The second lens group G2 consists of a biconvex lens L4. The third lens group G3 consists of a negative meniscus lens L5 with its concave surface facing the image side.

Table 5 lists the lens data of the object lens according to the fourth embodiment. In Table 5, f denotes the focal length of the object lens itself, NA denotes the numerical aperture of the object lens, β denotes the magnification achieved by the object lens and the focusing lens, and WD denotes the working distance (which equals the distance d0 along the optical axis between the image-side surface of the cover glass and the surface that is positioned closest to the object in the first lens group G1). Again, f1 is the focal length of the first lens group G1, f2 is the focal length of the second lens group G2, and f3 is the focal length of the third lens group G3.

The left column indicates the lens surfaces as numbered in serial order from the object side. Once again, "r" denotes the radius of curvature of each lens surface, "d" denotes the distance between two adjacent lens surfaces, "n" denotes the refractive index with respect to the d-line (λ=587.6 nm), and "v" denotes the Abbe number with respect to the d-line.

TABLE 5 f = 9.52
NA = 0.40
β = 20X
WD = 2.0

| | r | d | nd | νd |
|---|---|---|---|---|
| 1 | −11.1324 | 4.80 | 1.85 | 23.8 |
| 2 | 25.5439 | 2.20 | 1.50 | 82.5 |
| 3 | −6.1057 | 0.32 | | |
| 4 | 313.2178 | 3.02 | 1.52 | 70.0 |
| 5 | −8.3696 | 18.61 | | |
| 6 | 73.7982 | 2.16 | 1.52 | 64.1 |
| 7 | −34.5047 | 6.68 | | |
| 8 | 19.2923 | 2.65 | 1.55 | 45.9 |
| 9 | 13.0484 | | | |

(Corresponding parameters of the object lens)
f1 = 10.15
f2 = 45.80
f3 = −86.55
(1) f1/d0 = 5.075
(2) ν2p = 64.1
(3) ν1p−ν1n = 58.7

FIG. 8 illustrates various aberrations in the fourth embodiment. In FIG. 8, NA denotes the numerical aperture, Y denotes the image height, D denotes the d-line (λ=587.6 nm), C denotes the C-line (λ=656.3 nm), and F denotes the F-line (λ=486.1 nm). In the diagram that shows astigmatism, the solid lines indicate the sagittal image plane, and the broken lines indicate the meridional image plane. As is clear from FIG. 8, the aberrations of the object lens are satisfactorily corrected.

Any of the embodiments described can provide an inexpensive achromatic object lens which has a magnification of 20, a numerical aperture of 0.40, and a relatively long working distance. In each of the embodiments described, the aberrations are satisfactorily corrected both in the center portion of the image and at the periphery of the image.

While the invention has been described by way of exemplary embodiments, it is understood that the invention is not limited to the particulars disclosed. The invention extends to all equivalent structures, components, means, and uses such as are properly within the scope of the appended claims.

What is claimed is:

1. An object lens for a microscope comprising:
   a first lens group having a positive refractive power, the first lens group consisting of a first positive lens and a cemented lens composed of a negative lens and a second positive lens;
   a second lens group having a positive refractive power, the second lens group consisting of a positive lens for converting divergent light flux that has exited the first lens group into convergent light flux; and
   a third lens group having a negative refractive power, the third lens group consisting of a negative meniscus lens with its concave surface facing the image side, the first, second, and third lens groups being positioned in order from an object along an optical axis, the object lens satisfying the conditions $4.0 - f1/d0 \leq 15.0;$ $55 \leq \nu 2p;$ and $35 \leq \nu 1p - \nu 1n;$ when f1 denotes the focal length of the first lens group, d0 denotes the distance along the optical axis between an image-side surface of a cover glass and a surface that is positioned closest to the object in the first lens group, ν2p denotes an Abbe number of the positive lens of the second lens group, ν1p denotes an Abbe number of the positive lens composing part of the cemented lens in the first lens group, and ν1n denotes an Abbe number of the positive lens composing part of the cemented lens in the first lens group.

2. The object lens according to claim 1, wherein the first positive lens is a positive meniscus lens.

3. The object lens according to claim 2, wherein the positive meniscus lens is disposed between the object and said cemented lens.

4. The object lens according to claim 1, wherein the cemented lens is a cemented positive lens.

5. The object lens according to claim 1, wherein the first positive lens is a biconvex lens.

6. The object lens according to claim 5, wherein the biconvex lens is disposed between the cemented lens and the second lens group.

7. The object lens according to claim 6, wherein the cemented lens is a cemented positive lens.

8. The object lens according to claim 2, wherein the positive meniscus lens has a concave surface facing the object.

9. A finite optical system comprising:
   an object lens for a microscope including a first lens group having a positive refractive power, the first lens group consisting of a first positive lens and a cemented lens composed of a negative lens and a second positive lens, a second lens group having a positive refractive power, the second lens group consisting of a positive lens for converting divergent light flux that has exited the first lens group into convergent light flux, and a third lens group having a negative refractive power, the third lens group consisting of a negative meniscus lens with its concave surface facing the image side, the first, second, and third lens groups being positioned in order from an object along an optical axis, the object lens satisfying the conditions $4.0 \leq f1/d0 \leq 15.0;$ $55 \leq \nu 2p;$ and $35 \leq \nu 2p - \nu 1n;$ when f1 denotes the focal length of the first lens group, d0 denotes the distance along the optical axis between an image-side surface of a cover glass and a surface that is positioned closest to the object in the first lens group, ν2p denotes an Abbe number of the positive lens of the second lens group, ν1p denotes an Abbe number of the positive lens composing part of the cemented lens in the first lens group, and ν1n denotes an Abbe number of the positive lens composing part of the cemented lens in the first lens group; and
   a focusing lens positioned between the object lens and a resultant image.

10. The finite optical system according to claim 9, wherein said focusing lens includes a pair of cemented positive lenses.

11. The finite optical system according to claim 10, wherein said focusing lens further includes a prism disposed between the pair of cemented positive lenses and the resultant image.

12. The finite optical system according to claim 9, wherein the first positive lens is a positive meniscus lens.

13. The finite optical system according to claim 12, wherein the positive meniscus lens is disposed between the object and said cemented lens.

14. The finite optical system according to claim 9, wherein the cemented lens is a cemented positive lens.

15. The finite optical system according to claim 9, wherein the first positive lens is a biconvex lens.

16. The finite optical system according to claim 15, wherein the biconvex lens is disposed between the cemented lens and the second lens group.

17. The finite optical system according to claim 16, wherein the cemented lens is a cemented positive lens.

18. The finite optical system according to claim 12, wherein the positive meniscus lens has a concave surface facing the object.

19. The finite optical system according to claim 9, wherein said focusing lens includes a prism.

20. The finite optical system according to claim 10, wherein each of said cemented positive lenses includes a biconvex lens and a biconcave lens.

* * * * *